(No Model.)

W. C. EDGE.
HORSESHOE.

No. 508,607.　　　　　　　　　　Patented Nov. 14, 1893.

WITNESSES:
Gustave Dieterich
L. M. Wachtelhager

INVENTOR
William C. Edge,
BY Briesen & Knauth
his ATTORNEYS.

UNITED STATES PATENT OFFICE.

WILLIAM C. EDGE, OF NEWARK, NEW JERSEY.

HORSESHOE.

SPECIFICATION forming part of Letters Patent No. 508,607, dated November 14, 1893.

Application filed January 11, 1893. Serial No. 458,084. (No model.)

*To all whom it may concern:*

Be it known that I, WILLIAM C. EDGE, residing at Newark, Essex county, New Jersey, have invented Improvements in Horseshoes, of which the following is a specification, reference being had to the accompanying drawings, forming part hereof, wherein—

Figure 1:
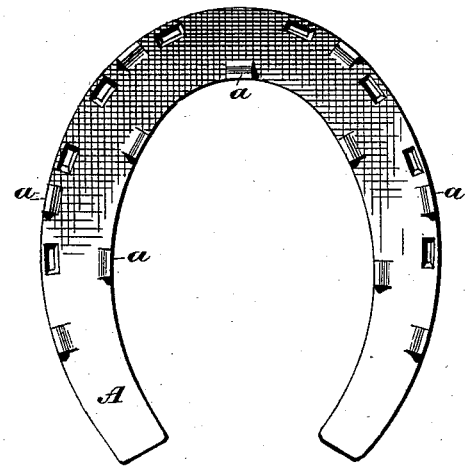
Figure 2:
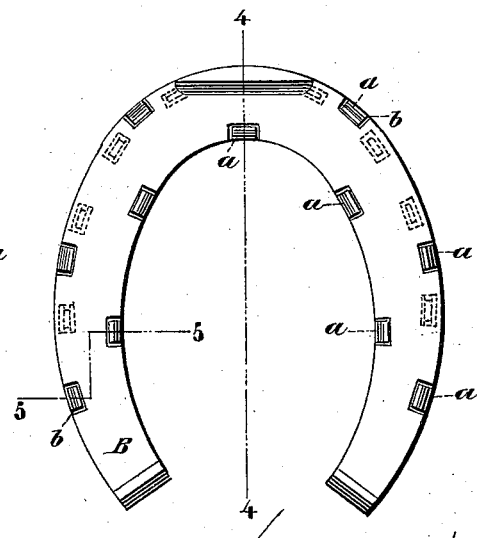
Figure 3:
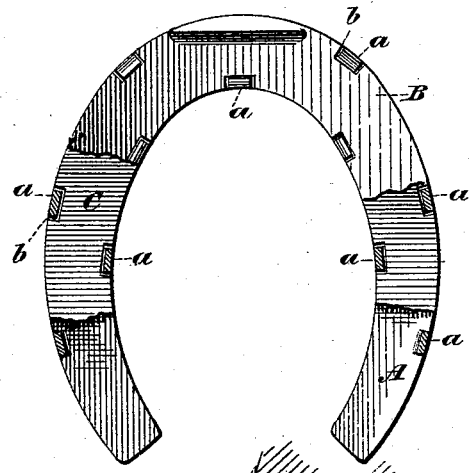
Figure 4:
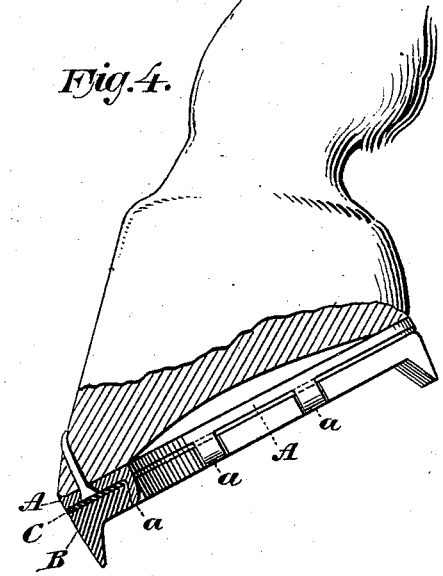
Figure 5:
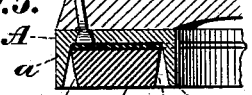
Figure 6:
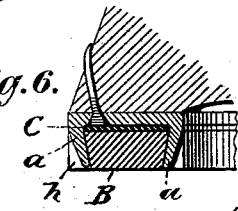

Figure 1 is a bottom view of the fastening-plate of my improved horseshoe. Fig. 2 is a bottom view of the complete shoe. Fig. 3 is a similar view of the same, with parts broken away. Fig. 4 is a longitudinal section on the line 4—4 of Fig. 2, showing the shoe attached. Fig. 5 is a transverse section on the line 5—5 of Fig. 2, before the sections are joined together. Fig. 6 is a like view of the same, after the sections are joined.

My invention relates to sectional horseshoes, and consists in the novel arrangement and combination of parts hereinafter described and specifically pointed out in the claim.

The object of my invention is to produce a horseshoe which is light, durable and the wearing face of which can be readily removed and replaced by a roughened wearing face or one having sharper or blunter calks or no calks at all, or by one of greater or less weight, without removing the nails from the horse's hoof.

In the drawings, A represents the horseshoe shaped fastening plate or section, which is preferably made of aluminium, and is provided with nail holes (see Fig. 1) through which pass the nails to secure the section A to the horse's hoof.

*a a* are downward projections or lugs forming part of and extending from the section A, on the inner and outer edges thereof.

B is the horseshoe shaped wearing plate or main section of the horseshoe, which is made of any suitable hard material and is provided with beveled kerfs or notches *b* corresponding in location to the location of the lugs *a* on the section A. These kerfs or notches are deepest at the wearing face of the plate B for purposes which will be hereinafter described.

C is a horseshoe shaped packing which may be of any flexible or elastic material, such as leather, paper, rubber, asbestus, &c., and which is placed between the two sections A and B to serve as a cushion between them and to prevent the transmission of heat.

The parts A, B and C are of the same outline and extent, horizontally considered.

In order to put my shoe into use, it is necessary to first attach the section A to the hoof of the horse, leaving the fastening lugs *a* still unbent, as shown in Fig. 5. The packing C is then placed against the under side of the section A, and the wearing plate or section B is then placed against the under side of the packing in such a manner that the lugs or projections *a* fit within the beveled kerfs or notches *b* of said section B. The lugs *a* are then bent over so as to engage the beveled walls of the kerfs or notches *b*, as shown in Fig. 6, thus uniting the two sections A and B and holding the packing C tightly between them.

When it is desired to substitute a new wearing plate for an old one, or in fact to remove the wearing plate B for any purpose whatever, it is merely necessary to bend the fastening lugs *a* out of contact with the beveled walls of the kerfs *b*, when the wearing plate can be removed.

It will be observed that by constructing the beveled kerfs or notches *b* with the deepest portion lowermost, or at the wearing face of the plate B, and bending the lugs *a* therein, the two sections A and B are clamped and always held securely together irrespective of the amount of wear upon the shoe (or plate B).

It is evident that the lugs *a*, or some of them, may be on the plate B, but I prefer to have them on the plate A as shown and described.

By my invention I am enabled to readily substitute one character of wearing plate B for another without the necessity of employing a horseshoer or removing the nails.

Having described my invention, what I claim is—

A horseshoe made in two superposed separable metallic sections A and B, fastening lugs *a* formed on the edges of one of said sections, and bevel kerfs *b* formed in the edges of the other of said sections, all arranged so that when the lugs *a* are bent against the beveled walls of the kerfs *b* the two sections will be united, substantially as described.

WILLIAM C. EDGE.

Witnesses:
HARRY M. TURK,
CHARLES E. SMITH.